(12) United States Patent
Hodgson

(10) Patent No.: US 7,789,947 B2
(45) Date of Patent: Sep. 7, 2010

(54) HONEYCOMB BODY, IN PARTICULAR LARGE HONEYCOMB BODY, FOR MOBILE EXHAUST-GAS AFTERTREATMENT, PROCESS FOR PRODUCING A HONEYCOMB BODY, PROCESS FOR TREATING EXHAUST GAS AND EXHAUST GAS ASSEMBLY

(75) Inventor: Jan Hodgson, Troisdorf (DE)

(73) Assignee: Emitec Gesellschaft fur Emissionstechnologie mbH, Lohmar (DE)

( * ) Notice: Subject to any disclaimer, the term of this patent is extended or adjusted under 35 U.S.C. 154(b) by 0 days.

(21) Appl. No.: 11/957,689

(22) Filed: Dec. 17, 2007

(65) Prior Publication Data

US 2008/0095976 A1    Apr. 24, 2008

Related U.S. Application Data

(63) Continuation of application No. PCT/EP2006/005533, filed on Jun. 9, 2006.

(30) Foreign Application Priority Data

Jun. 17, 2005    (DE) ................. 10 2005 028 044

(51) Int. Cl.
*B01D 46/00*    (2006.01)
*B01D 50/00*    (2006.01)
*B01D 39/00*    (2006.01)
*B01D 39/06*    (2006.01)
*B01D 39/14*    (2006.01)
*F01N 3/10*    (2006.01)
*F01N 3/08*    (2006.01)
*B21D 51/16*    (2006.01)

(52) U.S. Cl. .................. 95/273; 422/172; 422/173; 422/174; 422/175; 422/176; 422/177; 422/178; 422/179; 422/180; 55/522; 55/523; 55/524; 29/890

(58) Field of Classification Search .................. 95/273; 428/116; 422/172–180; 29/890; 55/522–524, 55/172–180
See application file for complete search history.

(56) References Cited

U.S. PATENT DOCUMENTS 4,832,998 A * 5/1989 Cyron ..................... 428/116

(Continued)

FOREIGN PATENT DOCUMENTS

DE          4025434 A1    2/1992

(Continued)

OTHER PUBLICATIONS

Korean Office Action dated Mar. 30, 2009.

*Primary Examiner*—Walter D Griffin
*Assistant Examiner*—Amber Orlando
(74) *Attorney, Agent, or Firm*—Laurence A. Greenberg; Werner H. Stemer; Ralph E. Locher

(57) ABSTRACT

A honeycomb body includes a housing and a plurality of layers with a curved profile and a predetermined length. Each layer includes at least one at least partially structured metal foil forming a multiplicity of passages with a passage cross section. A majority of the layers have different lengths than one another. A process for producing a honeycomb body, a process for treating exhaust gas, and an exhaust gas assembly, are also provided.

18 Claims, 5 Drawing Sheets

U.S. PATENT DOCUMENTS

| | | | |
|---|---|---|---|
| 5,102,743 A * | 4/1992 | Maus et al. | 428/593 |
| 5,105,539 A | 4/1992 | Maus et al. | |
| 5,139,844 A | 8/1992 | Maus et al. | |
| 5,456,890 A * | 10/1995 | Tsai et al. | 422/174 |
| 5,464,679 A * | 11/1995 | Maus et al. | 428/116 |
| 5,846,495 A * | 12/1998 | Whittenberger et al. | 422/180 |
| 6,049,961 A | 4/2000 | Wieres | 29/505 |
| 6,311,395 B1 * | 11/2001 | Wieres | 29/890 |
| 6,365,283 B1 * | 4/2002 | Bruck | 428/593 |
| 6,403,039 B1 | 6/2002 | Bruck et al. | |
| 6,699,587 B2 | 3/2004 | Iwami et al. | |
| 7,108,168 B2 * | 9/2006 | Bruck et al. | 228/181 |
| 7,383,633 B2 * | 6/2008 | Wieres | 29/890 |
| 2003/0152795 A1 * | 8/2003 | Kato | 428/593 |
| 2004/0197519 A1 * | 10/2004 | Elzey et al. | 428/68 |
| 2008/0206514 A1 * | 8/2008 | Wieres | 428/116 |

FOREIGN PATENT DOCUMENTS

| | | |
|---|---|---|
| DE | 19646242 A1 | 5/1998 |
| DE | 19704129 A1 | 8/1998 |
| EP | 1251250 A1 | 10/2002 |
| KR | 1990-701394 | 12/1990 |
| KR | 1998-702539 | 7/1998 |
| WO | 9003220 A1 | 4/1990 |
| WO | 9723273 A1 | 7/1997 |

* cited by examiner

US 7,789,947 B2

HONEYCOMB BODY, IN PARTICULAR LARGE HONEYCOMB BODY, FOR MOBILE EXHAUST-GAS AFTERTREATMENT, PROCESS FOR PRODUCING A HONEYCOMB BODY, PROCESS FOR TREATING EXHAUST GAS AND EXHAUST GAS ASSEMBLY

BACKGROUND OF THE INVENTION

Field of the Invention

The present invention relates to a honeycomb body including a housing and a plurality of layers with a curved profile and a predetermined length. The layers each include at least one at least partially structured metal foil forming a multiplicity of passages with a passage cross section. The invention also relates to a process for producing a honeycomb body, a process for treating exhaust gas and an exhaust gas assembly. Such honeycomb bodies are used in particular for exhaust-gas aftertreatment in the automotive industry.

Such metallic honeycomb bodies are preferably constructed by using metal foils and are used as carrier bodies for a catalytically active, adsorbing, oxidizing, reducing and/or further coating in exhaust systems of mobile internal combustion engines. Due to the extreme thermal and dynamic stresses which are present in such applications, it is particularly important to ensure a permanent connection between the individual metal foils as well as between the metal foils and the housing. The metal foils are usually connected to one another and to the housing by a joining technique, in particular by sintering, brazing and/or welding. For this purpose, it is necessary for sufficient contact locations between the adjacent metal foils and between the metal foils and the housing to be present at the desired connection locations, in such a way that those contact locations can serve as a basis for the connection.

In order to ensure stable connection of the metal foils to the housing, European Patent EP 0 245 737 B1, corresponding to U.S. Pat. Nos. 4,803,189; 4,832,998, 4,923,109; and 4,946,822, reveals that by shortening the corrugated sheet-metal layers by a predetermined distance as compared to the smooth sheet-metal layers, it is possible to ensure that the ends of the sheet-metal layers touch and nestle against the tubular casing. That nestling action makes it easier to effect a secure connection to the tubular casing with various touching angles.

International Publication No. WO 2005/033484, corresponding to pending U.S. patent application Ser. No. 11/396,991, filed Apr. 3, 2006, has disclosed a process for producing a metallic honeycomb body with a layer length difference, in which a plurality of smooth metal foils and at least partially structured metal foils are disposed in a housing, the smooth metal foils having a first length and the structured metal foils having a second length, and the difference between the first length and the second length being selected as a function of a prestress. In view of the fact that during the conventional production of honeycomb bodies of that type the structured metal foils are deformed if they are pressed into the housing under a considerable prestress, the production method proposed in International Publication No. WO 2005/033484, corresponding to pending U.S. patent application Ser. No. 11/396,991, filed Apr. 3, 2006, is supposed to nonetheless to ensure that the ends of the metal foils are in uniform contact.

However, in particular, in a configuration of honeycomb bodies in which the metal foils are not wound up helically or are only layered, zones of greater deformation and less successful formation of connections by joining techniques have occurred during production. That is attributable, for example, to the asymmetrical form of winding of the metal foils. However, in particular with a view toward series production, there is a risk of unevenly configured honeycomb bodies which have regions with more or less strongly deformed passage cross sections. That, by way of example, also influences the flow properties of an exhaust gas flowing through a honeycomb body of that type, so that under certain circumstances it could be necessary to align the honeycomb body to the flow profile of the exhaust gas.

Moreover, further difficulties have arisen in particular when producing large honeycomb bodies, for example for stationary use or for trucks. In particular, the handling of large sets of metal foils and of the forces produced during winding have proven difficult to control in a reliable process. As the diameter increases, the effects of an asymmetry during winding and/or the forces which are required for winding also become considerably higher. If it is not possible to wind or twist the metal foils to form a body which substantially corresponds to the contour of the inner region of the housing, high forces have to be applied to force the body into the housing. Under certain circumstances, due to the housings having ever thinner walls, the housing itself may even be deformed, which can lead to problems with integration in an exhaust system.

SUMMARY OF THE INVENTION

It is accordingly an object of the invention to provide a honeycomb body, in particular a large honeycomb body, for mobile exhaust-gas aftertreatment, a process for producing a honeycomb body, a process for treating exhaust gas and an exhaust gas assembly, which reduce or resolve the hereinafore-mentioned problems and disadvantages of the heretofore-known devices and methods of this general type. It is intended in particular to provide a honeycomb body which is distinguished by a particularly uniform configuration of passage cross sections, with in particular defined connection points being realized between individual metal foils or between the metal foils and the housing. Furthermore, it is intended to provide a process for producing a honeycomb body of this type, with which it is possible in particular to produce large honeycomb bodies with little force in a reliable process. It is preferentially also intended to describe how apparatuses for winding such large honeycomb bodies can be adapted in order to allow even series production of honeycomb bodies of a constant quality. Finally, it is also intended to specify uses for a honeycomb body of this type.

With the foregoing and other objects in view there is provided, in accordance with the invention, a honeycomb body, comprising a housing and a plurality of layers disposed in the housing and having a curved profile and a predetermined length. Each of the layers includes at least one at least partially structured metal foil forming a multiplicity of passages with a passage cross section. A majority of the layers have mutually different lengths.

A "layer" is configured in such a way that it forms at least a series of passages. This can be achieved, for example, by stacking structured metal foils, or one smooth and one structured metal foil, or two smooth metal foils with one structured metal foil disposed therebetween. The structure of the metal foil, which is preferably formed over the entire length of a layer, is usually similar to a sine wave, but may also have a zig-zag and/or square-wave configuration. As a result of the metal foils bearing against one another and of the provision of the structure, passages are formed, which are generally delimited by at least two of the metal foils. As a result, a passage cross section of the passages is defined. The passage cross section in particular has a semicircle-like, bell-like, rectangular, omega-shaped or similar configuration. The configuration of the passage cross section is preferably identical over the entire length.

The metal foil is preferably made from a high-temperature-resistant, corrosion-resistant material. In particular, a steel material with high aluminum and chromium contents is suitable for this purpose. The metal foils are preferably constructed with a thickness in a range of less than 0.15 mm, in particular in a range from 0.02 mm to 0.12 mm. In principle, the metal foil can also be constructed with openings, apertures or a microstructure (guide surfaces, studs, etc.) superimposed on the structure.

It is now proposed that the majority of the layers be constructed with different lengths than one another. This means first of all that the honeycomb body is formed by at least two layers. It is preferable for the honeycomb body to include a plurality of layers numbering more than 5, 10 or even 20. The layers can be disposed in several groups and then intertwined, in which case all of the layers of one group in each case follow a profile that is different from that of the further group or groups. It is also possible for all of the layers to be stacked on top of one another and thereby deformed to produce the honeycomb structure, so that substantially the same profile results for all of the layers. In this case, it is possible to form different winding types or shapes of the profile of the layers, in particular a spiral shape, an S shape, a V shape or a W shape. The type of winding can also be selected, for example, while taking the configuration of the housing into account as well. In principle, any housing cross section can be used, in particular a round, oval, polygonal, triangular or similar housing cross section. A feature common to all of these types of winding is that the layers are disposed with a curved profile, and the layer is preferably completely curved, i.e. does not have any flat sections. However, the curvature of the profile is irrelevant. For example, it is possible for different radii of curvature, concave and/or convex sections, turning locations, saddle locations or the like to be present.

The curved profile, and if appropriate the cross-sectional shape of the housing as well, lead to different degrees of deformation of the layers, so that after the winding, intertwining and/or twisting they form an outer contour which, for the same length of layer, does not correspond to the housing cross section. Therefore, the production process was heretofore configured in such a way that the layers had a length which was such that the entire housing cross section was reliably filled, with the projecting section of the layer being deformed during pressing into the housing.

The present invention for the first time deviates from that procedure, since it is proposed herein that the layer length for each individual layer be selected in such a way that the ends of the layers, prior to insertion into the housing, form a contour which substantially corresponds to the housing cross section. In view of the fact that in this case a multiplicity of different housing cross sections can be considered, at least the majority of the layers are constructed with layer lengths that are different from one another. It is particularly preferable for all of the lengths of the layers disposed in the honeycomb body to be constructed with a different length. A concept of that type has not heretofore been considered, since considerable difficulties were to be expected in the handling of the different layers and their positioning with respect to one another.

However, it has now been discovered that in particular in the case of large honeycomb bodies which, for example, have a diameter of greater than 150 mm or even greater than 200 mm (as are used in particular in trucks as well as in stationary applications), the integration of the metal foils in a housing can be carried out in a reliable process and using relatively low forces, so that there is virtually no deformation to the structure including the metal foil, and therefore a very homogeneous honeycomb structure is formed. In addition to improved flow properties on the part of the exhaust gas passing through a honeycomb body of this type, this in particular also leads to a defined contact between the individual metal foils and between the metal foils and the housing, so that connections by a joining technique can be formed in a reliable process and in a locally defined manner. This in turn leads to the thermal expansion properties of the metal foils with respect to one another and between metal foil and the housing, which are of importance in particular for large honeycomb bodies, being set deliberately and in a long-term manner.

In accordance with another feature of the invention, the passage cross section of at least 95% of the passages is identical. Very particularly preferably, at least 98% of all of the passage cross sections are identical, and a special preference is given to a configuration in which all of the passages which are completely delimited only by metal foils have the same passage cross section. This is made possible in particular due to the different lengths of the layers, which are selected in such a way that the layer ends, without significant deformation, simply finish at the housing, in which case it is possible to dispense with the need for smooth end sections of the structured metal foils to ensure that they nestle against the housing, yet contact with the housing is nonetheless ensured. It should be noted by way of explanation at this point that the passage cross section can also be regarded as "identical" if standard manufacturing tolerances are present.

In accordance with a further feature of the invention, the majority of the metal foils are constructed with different lengths than one another. This is to be understood as meaning in particular that the metal foils within a layer can also be constructed to have different lengths from one another. In this case the length of the layer results from the mean value of the lengths of the metal foils in one layer. In view of the fact that the layers have a height in a range of less than 10 mm and in particular less than 5 mm, with this configuration of the honeycomb body adaptation is effected even with such slight differing curvatures of the adjacent metal foils.

For certain applications, it may be advantageous for the housing to have at least one curved housing section and for at least some of the layers to end at this at least one curved housing section. This is to be understood in particular as meaning that the layers butt against the curved housing section but predominantly do not nestle over a certain housing section (for example more than 10 mm or 6 mm). The process of the ends of the layers nestling against the housing, which has been deployed heretofore, leads to increased consumption of material and greater deformation of the outer passages. As a result of the provision of different lengths of layers, it is possible for the layers to end directly at the housing even with this curved configuration.

In accordance with an added feature of the invention, the layers form touching points with the housing, and distances to adjacent touching points are selected to be unequal for at least some of the touching points. The uneven configuration of the distances between adjacent touching points is substantially also influenced by the winding type or the shape of the profile of the layers. This type of configuration of the touching points in particular leads to a homogeneous radial prestress and a reduction in the passage deformations in the edge region.

In accordance with an additional feature of the invention, the metal foils form contact locations with one another and with the housing. The contact locations together determine an overall contact region, and a cohesive connection is formed for at most 50% of the overall contact region. Preference is given to configurations in which at most only 30% or even only at most 10% of the overall contact region is formed with cohesive connections.

In particular, in the case of the configuration of rectilinear passages running substantially parallel to one another, a multiplicity of virtually linear contact locations between the individual metal foils or between the metal foil and the housing are formed. These contact locations are fundamentally available for forming connections by a joining technique between the above-mentioned components. The overall set of these contact locations is referred to herein as the "overall contact region". If the contact locations are, for example, substantially linear in form, the overall contact region results as the sum of the linear contact locations, so that ultimately it would be possible to specify an overall length. In addition, it should also be noted that the contact locations between the individual metal foils represent by far the majority, with the proportion formed by contact locations between the metal foils and the housing being, for example, in a range of less than 10%, in particular approximately 5%.

It is now proposed that at most 50% of this overall contact region be actually formed by a cohesive connection, while the remainder of the overall contact region not be used for this purpose, but rather the loose contact between the components allows sliding or different thermal expansion properties. The cohesive connection is preferably formed as a soldered or brazed connection generated by a brazing process. The configuration of the cohesive connections with respect to the honeycomb body can be selected as desired taking into account the thermal stressing and the materials used for the honeycomb body. In particular, the cohesive connections can be provided independently of one another and in a locally defined manner in the radial, axial and any other desired direction of the honeycomb body. By way of example, just an end-side attachment of all of the contact locations over the first few millimeters (e.g. 6, 8 or 10 mm) is preferable over the entire cross section of the honeycomb body, for which purpose, preferably, a solder or brazing material strip is placed between the individual layers and/or between the layers and the housing during production. In this way, depending on the size of the honeycomb body, it is even possible for less than 30% of the overall contact region to be actually formed by a cohesive connection. It is also possible for accurate application of solder or brazing material to the desired contact locations to be carried out through the use of printing methods (application in drop form, for example what is known as drop-on-demand, bubble-jet, continuous-jet processes). In the case of processes of this type, in particular, it is even possible for less than 10% of the overall contact region to be formed by a cohesive connection.

With the objects of the invention in view, there is also provided a process for producing a honeycomb body. The process comprises the following steps: a) A plurality of layers of a predetermined length are shaped. Each of the layers includes at least one at least partially structured metal foil forming a multiplicity of passages having a passage cross section. A majority of the layers have mutually different lengths. b) At least some of the plurality of layers are stacked on top of one another to form at least one stack. c) The at least one stack is deformed to produce a curved profile of the layers. d) The at least one stack is placed in a housing. The process is suitable, in particular, for producing a honeycomb body as described above in accordance with the invention.

With regard to step a), it should be noted that the shaping of layers may encompass in particular the cutting of metal foils, the structuring of metal foils, the stacking of metal foils on top of one another, the aligning of metal foils with respect to one another, the temporary connection of metal foils (e.g. by a bonding agent or adhesive) and other operations. In particular, step a) forms at least one row of passages disposed next to one another. Each passage is preferentially delimited partially by a structured metal foil and partially by a smooth metal foil.

Then, in accordance with step b), at least some of the shaped layers are stacked on top of one another. The number of stacks can preferably always be selected in a range of from 1 to 6.

Next, in accordance with step c), the stacks are deformed. This can, for example, also take place in a plurality of stages so that, for example, first of all each stack is deformed, in particular bent or turned in, separately, then the stacks are positioned with respect to one another and jointly wound, intertwined, bent or deformed in a similar way. After step c), the stacks or the layers contained therein are preferably formed with a curved profile over their entire length. In particular, regions of different radii of curvature are present.

Finally, in accordance with step d), the stacks are disposed in a housing. Before and/or after the stack has been placed in the housing, it is possible for additives to be applied in and/or on the honeycomb body, with the additives in particular including measures for forming cohesive connections (such as in this case for example binders, bonding agents, bonding restrictors (e.g. wax, oil), solder or brazing material, etc.).

In accordance with another mode of the invention, step b) takes place in such a way that the plurality of layers of a stack are disposed offset with respect to one another. This means, for example, that adjacent layers may be constructed not only with different lengths but may also be disposed offset with respect to one another, i.e. they do not form one common terminating plane. The style and nature of the offset is in turn dependent on the configuration of the housing and the structures of the metal foils. Under certain circumstances, it may also be advantageous for even the metal foils within one layer to be disposed offset with respect to one another.

In accordance with a further mode of the invention, the plurality of layers are magnetically fixed at least during step a) or b). Due to the different lengths of the layers and/or of the offset provided between the individual layers, handling of the stacks or layers presents problems. It is now proposed that the layers or metal foils or stacks be held in defined positions with respect to one another through the use of at least one magnet. This allows transporting and/or storage of the layers or stacks even without the use of a bonding agent, in which case the handling units used for this purpose can be used for different layers and/or honeycomb bodies simultaneously. The layers can be fixed by magnetic grippers, magnetic underlays and the like.

In accordance with an added mode of the invention, as has already been indicated, step c) can be carried out in at least two stages, in which case it is advantageous that at least one of the following actions is carried out:
 folding over the at least one stack;
 aligning a plurality of stacks with respect to one another;
 intertwining a plurality of stacks;
 deforming the at least one stack using a first tool as far as a first extent and deforming the at least one stack further using at least one second tool.

The implementation of the above-mentioned actions is advantageous in particular in the case of honeycomb bodies which ultimately have a diameter of greater than 150 mm, in particular greater than 200 mm. In the two-stage configuration of the winding process, particularly gentle production can be realized with only slight deformation of the passages and/or using relatively low forces.

This is to be explained below for a honeycomb body which has been wound helically and is formed (albeit not necessarily) with a plurality of layers of different lengths. For this case, the following procedure could be advantageous:

shaping a layer which includes at least one at least partially structured metal foil, so as to form a multiplicity of passages;

fixing the layer in an end region using a gripping unit;

rotating the gripping unit, so that the layer places itself around the gripping unit and forms a honeycomb body of increasing diameter;

determining that the honeycomb body has reached a first extent;

activating with at least one second tool or guide or drive;

further placing the stack against the existing circumferential surface of the honeycomb body until it has reached the desired diameter.

In this context, reference is made in particular to the supplementary explanations given in connection with FIG. 11. The reaching of the first extent can be determined on the basis of the rotational angle of the gripping unit and/or directly at the honeycomb body.

In accordance with an additional mode of the invention, step c) is used to form a cylindrical honeycomb structure with a diameter. The honeycomb structure has a change in diameter of at most 5% before and after being disposed in the housing. It is preferable for the change in diameter to be in a range of less than 2% (corresponding, for example, to a diameter deviation of less than 3 mm). This illustrates the accuracy with which a honeycomb structure having a predetermined outer contour can be formed by the process according to the invention, so that this outer contour is very close to the housing cross section. Making the contour of the honeycomb structure so close to the housing cross section allows all of the edge regions (in the case of housings which are not round) to be filled uniformly while at the same time avoiding deformation of passages in the edge region. Nevertheless, reliable contact between the ends of the layers and the housing, for example to form connections by a joining technique, is ensured.

In accordance with yet another mode of the invention, a deformation of the honeycomb body over its circumference is carried out as step e). This means in other words that after the stack has been disposed in the housing, a further, minor, plastic deformation of the honeycomb body, known as "calibration", is additionally carried out. For this purpose, by way of example, radially inwardly directed pressure is exerted uniformly over the periphery of the housing, so that the housing is calibrated to a desired diameter or a predetermined roundness or other shape accuracy. At the same time, "relaxing" or "relieving" of the layers or metal foils in the interior can take place, so that once again reliable contact between the ends of the layers and the housing is ensured.

In accordance with yet a further mode of the invention, as step f), regionally delimited cohesive connections are produced at least between the metal foils or at least between a metal foil and the housing. The regions are constructed differently in various planes of the honeycomb body. It is preferable to produce cohesive connections both between the individual metal foils and to the housing.

The term "regionally delimited connections" is to be understood in particular as meaning that the honeycomb body has regions with cohesive connections and without cohesive connections to compensate for different thermal expansion properties. The regions may be large-area or large-volume parts of the honeycomb body, for example a star-shaped zone or a peripheral zone toward the housing, but it is equally possible for a region to be restricted to a certain number of passages, for example fewer than 10 passages disposed adjacent one another. Regionally delimited cohesive connections may also be present in the direction of a passage, so that the metal foils forming the passage are not cohesively connected to one another over the entire length of the passage. Once again, it is preferable to use a configuration of the honeycomb body in which, for example, at most 10% of the overall contact region has a cohesive connection, in particular only at most 5%. The cohesive connections are formed differently in different planes. The planes may be considered both in the direction of the passages and transversely with respect thereto. In principle, there may also be planes in which no cohesive connections are disposed.

With the objects of the invention in view, there is additionally provided a process for treating exhaust gas. The process comprises providing a vehicle exhaust system and connecting a honeycomb body produced according to the invention to the exhaust system.

With the objects of the invention in view, there is concomitantly provided an exhaust gas assembly. The assembly comprises a vehicle exhaust system and a honeycomb body connected to the exhaust system.

Preference is given to a honeycomb body as described above in accordance with the invention or a honeycomb body which has been produced by the process described in accordance with the invention, being used in combination with an exhaust system of an automobile. Very and particularly preferably, the invention proposes a use for exhaust systems of trucks, in which case the honeycomb body has a diameter of greater than 150 mm.

Other features which are considered as characteristic for the invention are set forth in the appended claims, in which features listed individually can be combined with one another in any technologically appropriate way so as to provide further configurations of the invention.

Although the invention is illustrated and described herein as embodied in a honeycomb body, in particular a large honeycomb body, for mobile exhaust-gas aftertreatment, a process for producing a honeycomb body, a process for treating exhaust gas and an exhaust gas assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
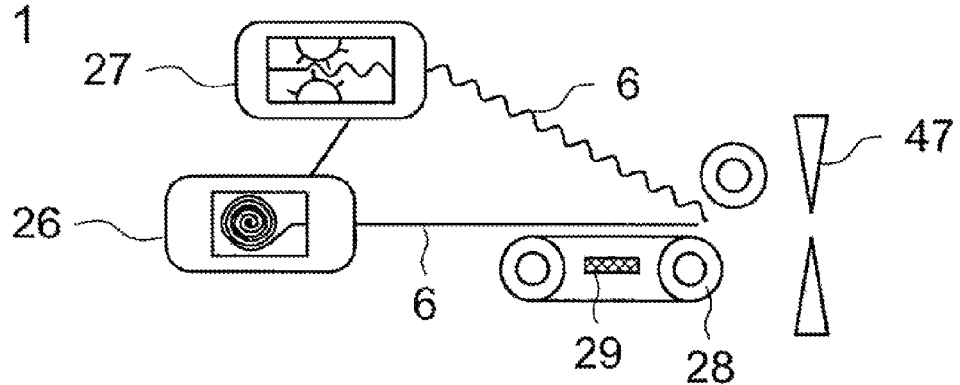
FIG. 1 is a diagrammatic, side-elevational view illustrating an exemplary embodiment of the production of a layer for a honeycomb body.
Figure 2:
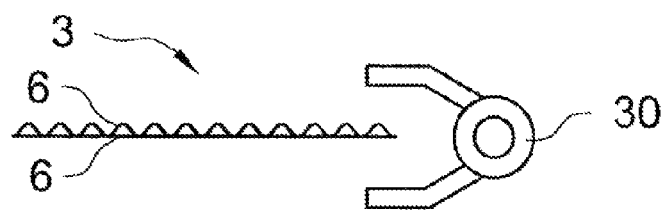
FIG. 2 is a side-elevational view illustrating the transporting of a layer.
Figure 3:
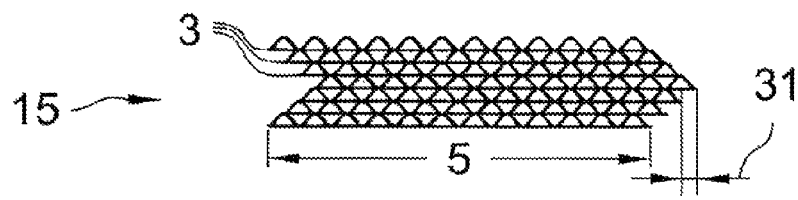
FIG. 3 is a side-elevational view illustrating a stack of a plurality of layers.
Figure 4:
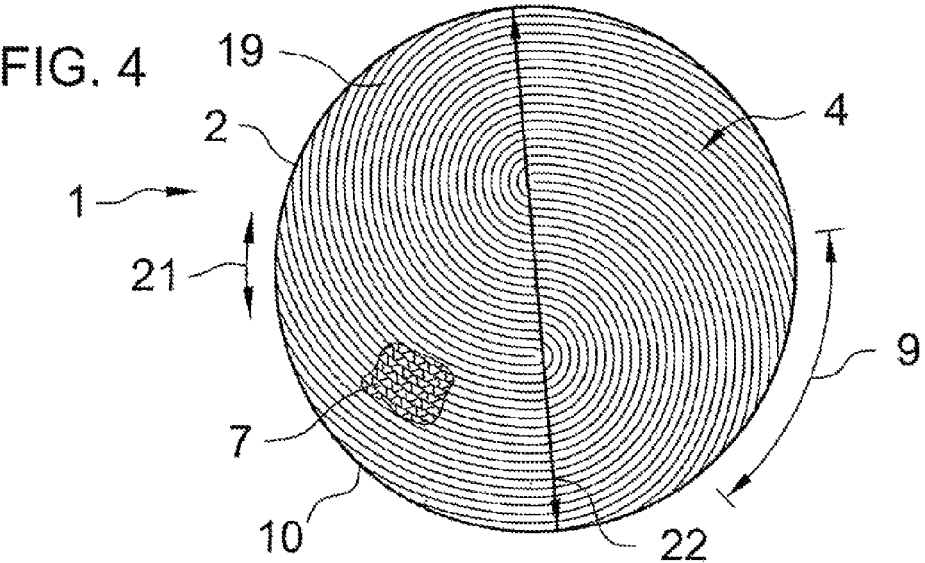
FIG. 4 is an end-elevational view illustrating a honeycomb body with wound layers in a housing.

Referring now in detail to the figures of the drawings, which are diagrammatic and accordingly are not generally suitable for representing size ratios, and first, particularly, to FIGS. 1 to 4 thereof, there is illustrated a process for producing a honeycomb body. FIG. 1 shows the shaping of layers, FIG. 2 shows the transporting of a layer to a stack, which is then built up in accordance with FIG. 3, and finally FIG. 4 illustrates the configuration of two stacks with a curved profile within a housing.

The apparatus illustrated in FIG. 1 includes a smooth-strip delivery mechanism 26, in which a smooth metal foil 6 is rolled up, for example on a coiler. On one hand, the smooth-strip delivery mechanism 26 delivers a smooth metal foil 6 to a corrugated-strip installation 27, in which a structured metal foil 6 is produced from the smooth metal foil 6 (for example by corrugation rolling). On the other hand, the smooth-strip delivery mechanism 26 delivers the smooth metal foil 6 over a conveyor belt 28, which is constructed with a magnet 29 to fix the smooth metal foil 6 in place. In the illustrated example, the structured metal foil 6 and one smooth metal foil 6 are combined with one another to produce a layer 3 (shown in FIG. 2). The two metal foils 6 are disposed on top of one another and together are fed to a cutting apparatus 47 which forms the layers 3 of a desired length from the endless metal foils 6.

As is illustrated in FIGS. 2 and 3, the layer 3 formed in this way, including a fully structured metal foil 6 and a fully smooth metal foil 6, is now disposed in such a way as to form a stack 15, through the use of a gripper 30 which preferably likewise has measures for magnetically fixing the layer 3 in place. A plurality of layers 3 (at least in some cases having different lengths 5 than one another) are now stacked individually on top of one another, with an offset 31 between the layers 3 positioned adjacent one another additionally being provided. In the illustrated variant embodiment, seven layers 3 are combined to form a stack 15.

Two of the stacks 15 are then first of all separately turned over, so that two ends of the layers 3 are positioned on one side. Then, the two stacks 15 are intertwined and introduced into a housing 2 shown in FIG. 4, so as to form a desired honeycomb body 1. The honeycomb body 1 produced in this way includes the housing 2 and a honeycomb structure 19 formed by the layers 3, in which the layers 3 are disposed therein with a curved profile 4. The ends of the layers 3 butt directly against the housing 2 over a circumference 21, in particular including a curved housing section 9. Touching points 10 of the layers 3 in the region of the housing section 9 are preferably suitable for the production of connections by a joining technique between the layers 3 and the housing 2. FIG. 4 also partially illustrates the structure with passages 7 to illustrate the honeycomb structure 19.

Figure 5:
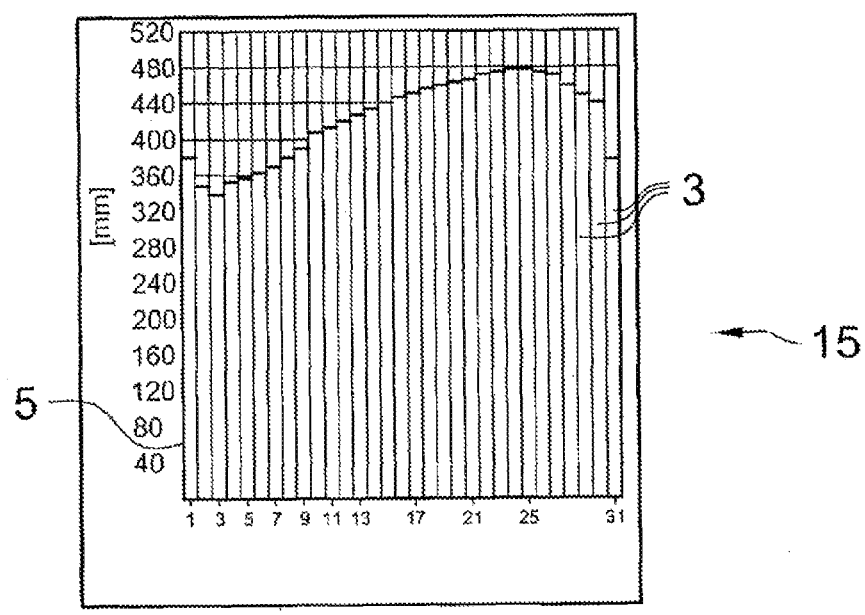
FIG. 5 is a diagram showing layer lengths of a stack.
Figure 6:
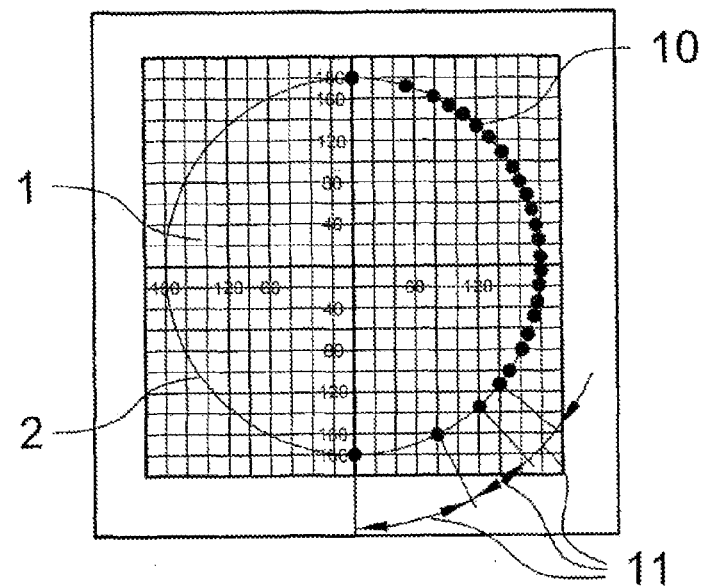
FIG. 6 is an end-elevational view representing touching points between the layers and the housing.

FIG. 5 shows an exemplary embodiment of the different lengths 5 of the layers 3 of a honeycomb body 1, which is configured with an S-shaped profile 4 of the layers 3, as in FIG. 4. The length 5 of the layers 3 is plotted on the ordinate, and the number of layers 3 of a stack 15 is plotted on the abscissa. It can be seen from the illustration that no layer 3 is adjacent two layers 3 having the same length 5 as itself, and in particular that none of the adjacent layers 3 has the same length 5 as any specified layer 3. It can also be seen that more than 20 mm, 50 mm or even 100 mm can lie between the maximum length 5 and the minimum length 5 of a layer 3 within a stack 15. If the stack 15 illustrated in FIG. 5 is now wound in an S-shape, touching points 10 are formed at the housing 2, as illustrated in FIG. 6. It can be seen in this case that the touching points 10 are formed at a distance 11 from one another which is not constant, but rather varies from one another.

Figure 7:
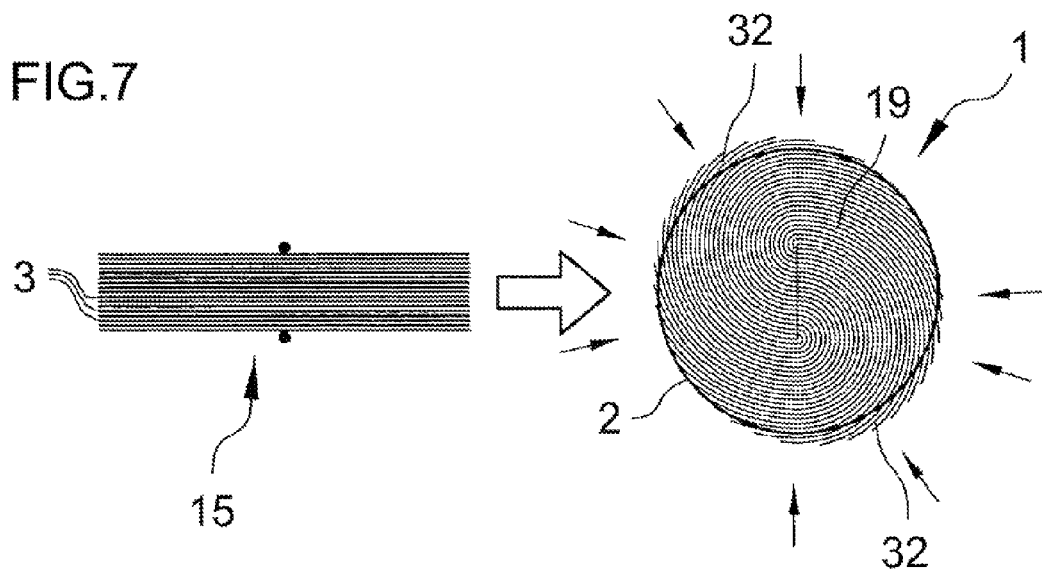
FIG. 7 includes a side-elevational view and an end-elevational view representing technical problems involved in a known process for producing a honeycomb body.

FIG. 7 illustrates, by way of example, a shaping error which has occurred in the known production method. In the left-hand illustration in FIG. 7, a stack 15 including a plurality of layers 3 is used, in which the layers 3 are constructed with a uniform length 5. After the winding operation, however, the result is a honeycomb structure 19 which has an oval contour. Should it be desired to introduce this honeycomb structure 19 into a cylindrical housing 2, particular forces have to act on projecting deformation regions 32, with the passages formed there being deformed. That is avoided by the process according to the invention and the honeycomb body according to the invention.

Figure 8:
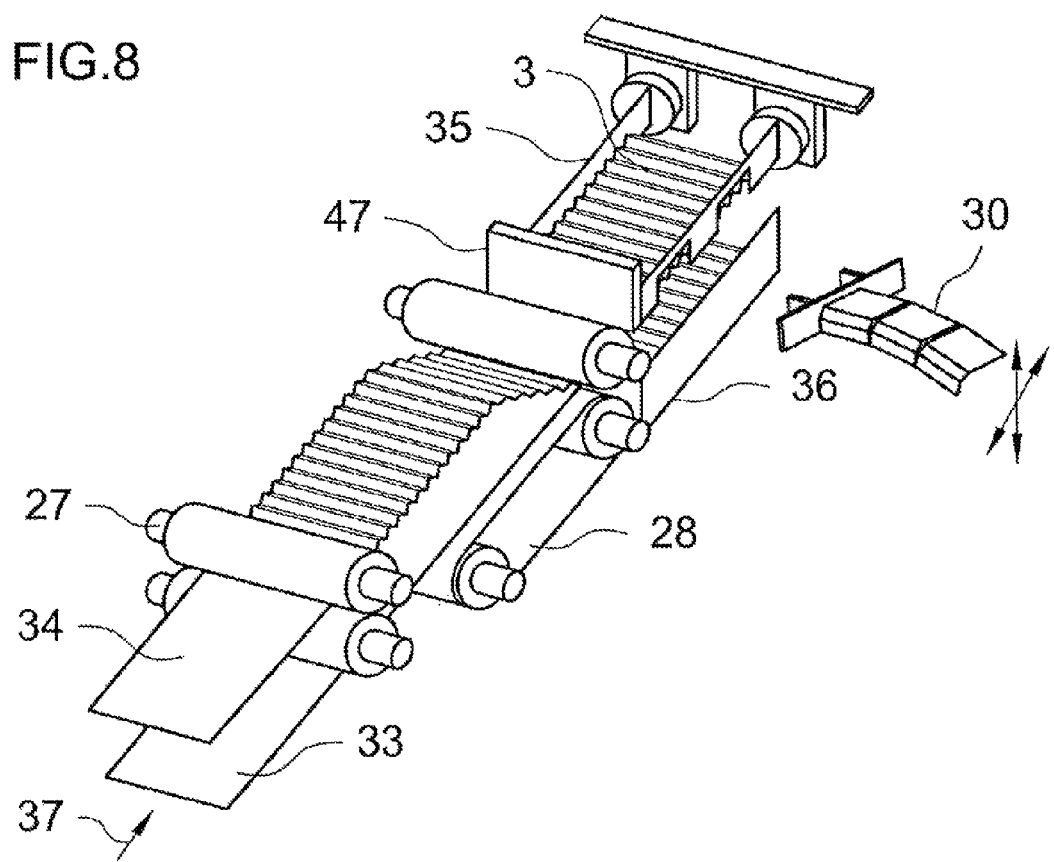
FIG. 8 is a perspective view of a variant embodiment of the production process for a honeycomb body.

FIG. 8 illustrates a variant embodiment of a production line for layers 3 of a predetermined length 5, each of which includes at least one at least partially structured metal foil 6. In this case, a corrugated strip 34 is produced through the use of a corrugated-strip installation 27 and transported simultaneously with a smooth strip 33, which is being transported in an advancing direction 37, through the use of a conveyor belt 28, to a cutting apparatus 47. The cutting apparatus 47 severs layers 3 from the corrugated strip 34 and smooth strip 33 simultaneously, and these layers are then connected in an intermediate tray 35. The cut layer 3 is transferred from the intermediate tray 35 to a stacking tray 36 through the use of a gripper 30, which can move in different directions and can also rotate, if appropriate. This transfer can be performed with a desired alignment with respect to the adjacent layer 3, for example with a specific offset. The stack 15 formed in this way can finally be transferred by the gripper 30 to a further processing station. The gripper 30 is preferably constructed with measures for magnetically fixing the layers 3 in place.

Figure 9:
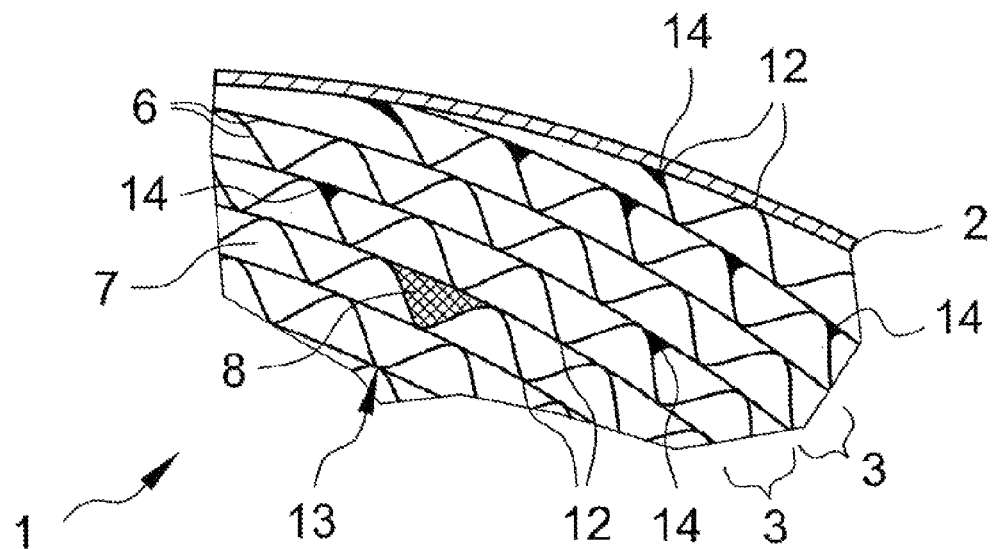
FIG. 9 is an enlarged, fragmentary view of a honeycomb body.

FIG. 9 shows a portion of a honeycomb body 1 which includes a multiplicity of layers 3 disposed in a housing 2. The layers 3 are each formed by one smooth and one corrugated metal foil 6, so as to form passages 7 with a predetermined passage cross section 8. The passage cross section 8 of all of the passages 7 which are formed entirely by metal foils 6 are substantially identical.

It can also be seen from FIG. 9 that there are regions including connections 14. In the illustrated variant embodiment of the honeycomb body 1, all of the corrugated metal foils 6 are constructed with a connection 14, which is a brazed connection, at contact locations 12 with the housing 2. Although FIG. 9 does not show any connections 14 with regard to contact locations 12 between the smooth metal foils 6 and the housing 2, these contact locations 12 may nevertheless at least in some cases be constructed with a similar connection 14. Regionally delimited connections 14 are also provided in contact locations 12 between the metal foils 6 in the interior of the honeycomb structure 19. It can be seen that different layers 3 are constructed with different numbers of connections 14, which may be based on regular intervals or may be variable. This regional formation of connections 14 by a joining technique enables the honeycomb body 1 to expand and contract relatively freely as a result of fluctuating thermal stresses, both in the direction of the profile of the passages and in the direction of the profile of the layers 3, both axially and radially with respect to the honeycomb body 1. The contact locations 12 together determine an overall contact region 13, with a cohesive connection 14 being formed for at most 50% of the overall contact region 13. Configurations in which at most only 30% or even only at most 10% of the overall contact region 13 is formed with cohesive connections 14, are preferred.

Figure 10:
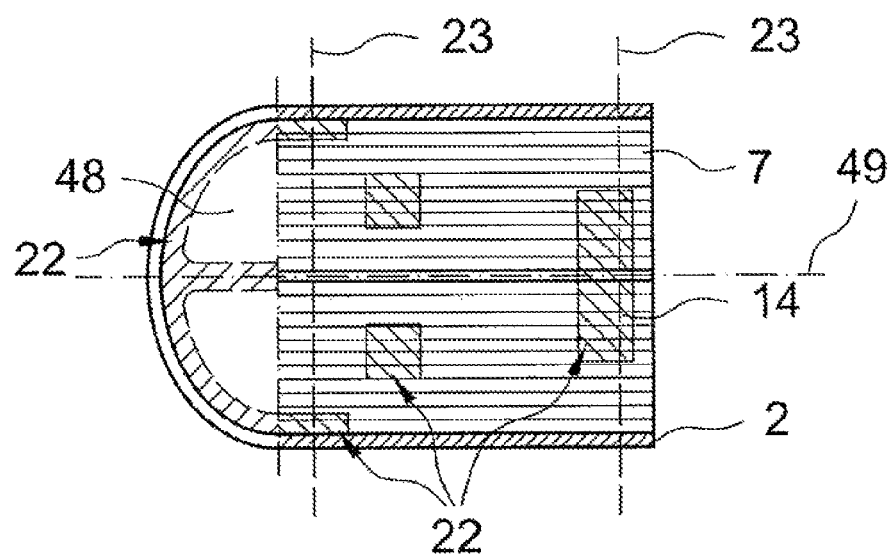
FIG. 10 is a sectional view representing regions with cohesive connections in a honeycomb body.

FIG. 10 illustrates a somewhat greater regional extent of connections 14 formed by a joining technique. The illustrated honeycomb body 1 has one region 22 including connections 14 in the vicinity of an end side 48. This region 22 is disposed substantially in the vicinity of the housing 2 and widens radially inwardly in a sub-zone. This end-side region 22, however, does not extend over the entire depth of the honeycomb body 1 in the direction of an axis 49, but rather only over part of the depth. In addition, further regions 22 with connections 14 are formed in inner zones of the honeycomb body 1. In the illustration presented in FIG. 10, two planes 23 perpendicular to the axis 49 are shown. The regions 22 are formed differently in the planes 23 of the illustrated honeycomb body 1.

Figure 11:
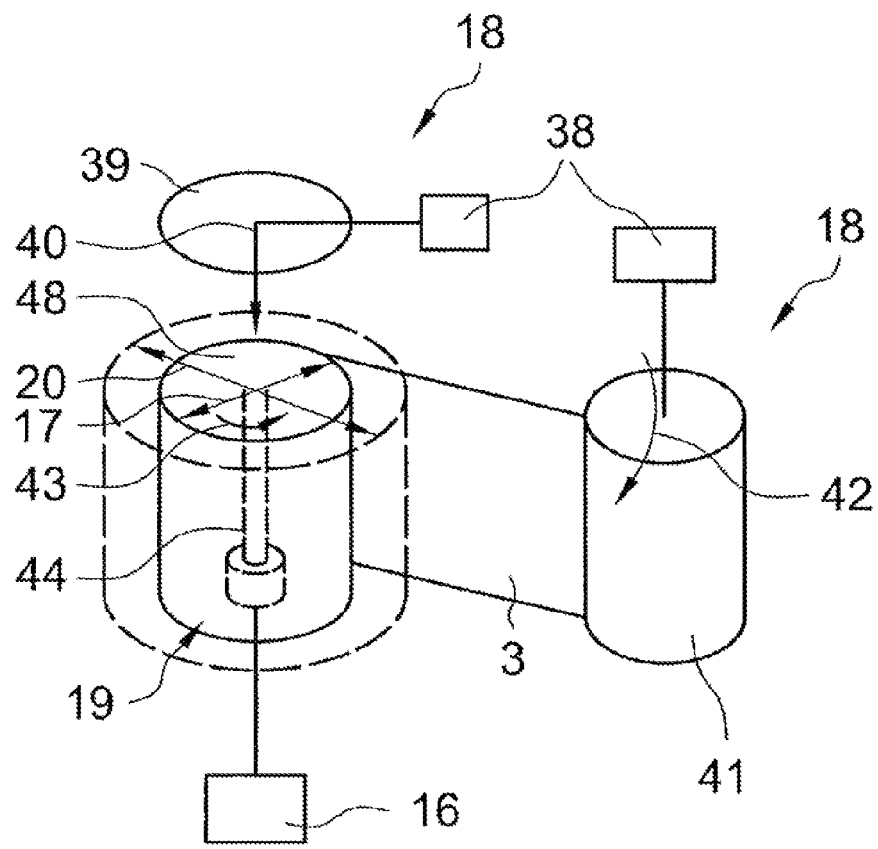
FIG. 11 is a perspective view of an apparatus for the two-stage winding of a honeycomb body.

FIG. 11 shows an apparatus for helically winding up at least one layer 3 to form a honeycomb body 1. The layer 3 is guided from a layer reservoir 41 to a mandrel 44, which fixes one end of the layer 3. The mandrel 44 is part of a first tool 16 which allows a rotation 43 of the mandrel 44 about its own axis. In a first stage of the winding process, the layer reservoir 41 is in a fixed position and the honeycomb body 1 is formed exclusively on the basis of the rotation 43 of the mandrel 44. When a predetermined extent 17, for example an extent 17 in the vicinity of 50 mm, is reached, a second tool 18 is switched on in order to build up the honeycomb body 1 further until it reaches its ultimately desired diameter 20.

FIG. 11 shows two further second tools 18, which can be used individually or in combination, on their own or to assist the first tool 16. The second tool 18 explained above includes a ram 39 which is brought into engagement or contact with one of the end sides 48 of the honeycomb structure 19, for example by a displacement movement 40. This second tool 18 is preferably constructed with a drive 38, so that the ram 39 can rotate synchronously with the mandrel 44. In this way, the forces required for rotation of the honeycomb structure are distributed between a plurality of drives 38 or over a larger area of the end side or end sides 48 of the honeycomb structure 19, so that even as the extent 17 becomes greater a uniform configuration of the layer 3 around the honeycomb structure 19 which has already been formed is ensured. The ram 39 may also be provided as part of a base or in a circumferential region of the mandrel 44. Furthermore, it is also possible for the ram 39 to be constructed with a plurality of recesses or heightenings which, for example, engage in the passages 7 of the honeycomb structure 19 that has already been formed. Furthermore, it is also possible to use measures with an equivalent action, such as further pins, magnetic plates, etc., for a large-volume force introduction space.

Furthermore, it is also possible to use the layer reservoir 41 itself to form a second tool 18. In this case, the layer reservoir 41 can change its position relative to the honeycomb structure 19 being formed, in particular it can circulate around it, in which case the radius toward the mandrel 44 can be varied. It is possible in this way to describe a path 42 in which the layer reservoir 41 (similarly to a spiral) runs around the honeycomb structure 19 at an increasing distance and thus brings the layer 3 into contact. This second tool 18 may also be constructed with a drive 38 in order to execute this path 42 and/or to realize rotation of the layer reservoir 41 itself.

It is preferable for the first and second tools 16 and 18 to operate in a controlled way which is suitably adapted to one another. In addition, it is possible to provide measures for determining the current extent 17, the positioning of the ram 39 and/or the production of relative movements of the second tools 18 with respect to the first tool 16.

Figure 12:
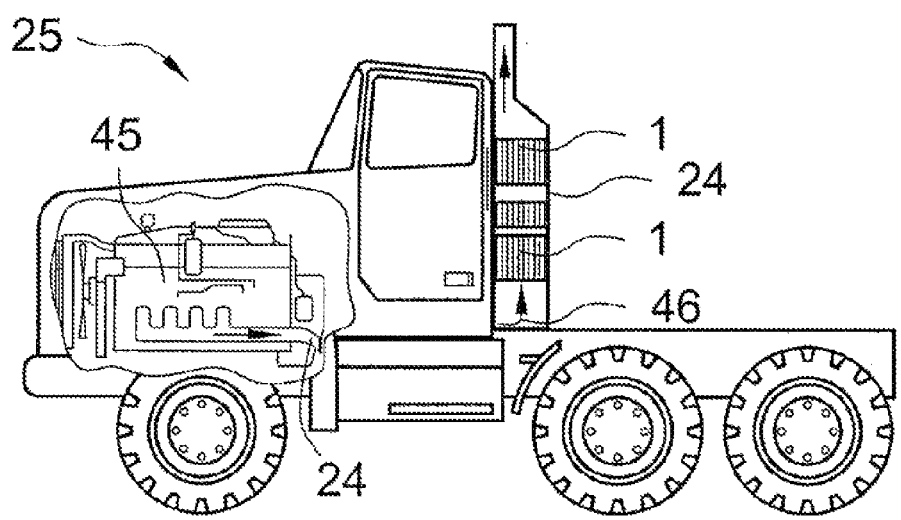
FIG. 12 is a partly broken-away, side-elevational view of a vehicle having an exhaust system with a honeycomb body.

FIG. 12 illustrates the preferred use of a honeycomb body 1 described herein. The figure illustrates a vehicle 25 in the form of a truck with an internal combustion engine which is constructed as a diesel engine 45. Exhaust gases produced in the engine 45 are fed through an exhaust system 24, in a flow direction 46, to a plurality of honeycomb bodies 1 having different functions, before the purified exhaust gases are ultimately released to atmosphere. In vehicles 25 or automobiles of this type, honeycomb bodies 1 with a diameter of greater than 150 mm are used in particular. The honeycomb bodies 1 and processes for producing them, as described herein, are especially suitable in particular for these honeycomb bodies 1.

The invention claimed is:

1. A honeycomb body, comprising:
   a housing; and
   a plurality of layers disposed in said housing, wound in an S-shape with adjacent layers having different radii of curvature to form the honeycomb body and having a predetermined length, each of said layers including at least one at least partially structured metal foil forming a multiplicity of passages with a passage cross section, said passage cross section of at least 95% of said passages being identical, a majority of said layers having mutually different lengths, and at least one of the following conditions being fulfilled:
   no one of said layers is adjacent two others of said layers having the same length as said one layer;
   said layers have a maximum length, a minimum length and more than 20 mm between said maximum and minimum lengths; and
   said layers have ends forming touching points with said housing disposed at unequal distances from adjacent touching points.

2. The honeycomb body according to claim 1, wherein a majority of said metal foils have mutually different lengths.

3. The honeycomb body according to claim 1, wherein said metal foils form contact locations with one another and with said housing, said contact locations together determining an overall contact region having a cohesive connection for at most 50% of said overall contact region.

4. A process for producing a honeycomb body, the process comprising the following steps:
   a) shaping a plurality of layers of a predetermined length, each of the layers including at least one at least partially structured metal foil forming a multiplicity of passages having a passage cross section, said passage cross section of at least 95% of said passages being identical, a majority of the layers having mutually different lengths, and at least one of the following conditions being fulfilled:

no one of the layers is adjacent two others of the layers having the same length as the one layer;

the layers have a maximum length, a minimum length and more than 20 mm between the maximum and minimum lengths;

b) stacking at least some of the plurality of layers on top of one another to form at least one stack;

c) deforming the at least one stack by winding in an S-shape with adjacent layers having different radii of curvature to produce a curved profile of the layers; and d) placing the at least one S-shaped stack in a housing with ends of the layers forming touching points with the housing disposed at unequal distances from adjacent touching points.

5. The process according to claim 4, which further comprises carrying out step b) in such a way that the plurality of layers of a stack are mutually offset.

6. The process according to claim 4, which further comprises magnetically fixing the plurality of layers at least during step a) or b).

7. The process according to claim 4, which further comprises carrying out step c) in at least two stages.

8. The process according to claim 7, which further comprises carrying out at least one of the following steps:

folding over the at least one stack;

aligning a plurality of the stacks with respect to one another;

intertwining a plurality of the stacks; and deforming the at least one stack using a first tool as far as a first extent and deforming the at least one stack further using at least one second tool.

9. The process according to claim 7, which further comprises folding over the at least one stack.

10. The process according to claim 7, which further comprises aligning a plurality of the stacks with respect to one another.

11. The process according to claim 7, which further comprises intertwining a plurality of the stacks.

12. The process according to claim 7, which further comprises deforming the at least one stack using a first tool as far as a first extent and deforming the at least one stack further using at least one second tool.

13. The process according to claim 4, which further comprises carrying out step c) to form a cylindrical honeycomb structure with a diameter, the honeycomb structure having a change in the diameter of at most 5% before and after being disposed in the housing.

14. The process according to claim 4, which further comprises deforming the honeycomb body over its circumference as step e).

15. The process according to claim 4, which further comprises producing cohesive connections being delimited in regions at least between the metal foils, and constructing the regions differently in various planes of the honeycomb body.

16. The process according to claim 4, which further comprises producing cohesive connections being delimited in regions at least between a metal foil and the housing, and constructing the regions differently in various planes of the honeycomb body.

17. A process for treating exhaust gas, which comprises the following steps:

providing a vehicle exhaust system; and connecting a honeycomb body produced according to the process of claim 4 to the exhaust system.

18. An exhaust gas assembly, comprising:

a vehicle exhaust system; and a honeycomb body according to claim 1 connected to said exhaust system.

* * * * *